(12) United States Patent
Gothelf et al.

(10) Patent No.: US 8,447,254 B2
(45) Date of Patent: May 21, 2013

(54) RECEIVER AND A METHOD OF RECEIVING A SIGNAL

(75) Inventors: Ulrich Vesterager Gothelf, Måløv (DK); René Schmelling, Dyssegård (DK)

(73) Assignee: Thrane and Thrane A/S, Lyngby (DE)

( * ) Notice: Subject to any disclaimer, the term of this patent is extended or adjusted under 35 U.S.C. 154(b) by 410 days.

(21) Appl. No.: 12/801,185

(22) Filed: May 27, 2010

(65) Prior Publication Data

US 2010/0311377 A1    Dec. 9, 2010

Related U.S. Application Data

(60) Provisional application No. 61/213,430, filed on Jun. 8, 2009.

(51) Int. Cl.
*H04B 1/06*    (2006.01)
*H04B 7/00*    (2006.01)

(52) U.S. Cl.
USPC .................. 455/272; 455/344; 455/276.1

(58) Field of Classification Search
USPC .............. 455/3.02, 272, 153.1, 170.1, 275, 455/276.1, 344, 345
See application file for complete search history.

(56) References Cited

U.S. PATENT DOCUMENTS

| | | | |
|---|---|---|---|
| 4,652,882 A | * | 3/1987 | Shovlin et al. ................ 342/150 |
| 4,663,631 A | | 5/1987 | Brilman et al. |
| 6,018,315 A | | 1/2000 | Ince et al. |
| 6,512,486 B1 | | 1/2003 | Desargant et al. |

FOREIGN PATENT DOCUMENTS

| | | |
|---|---|---|
| EP | 0 166 367 | 6/1985 |
| EP | 0 716 318 | 6/1996 |
| EP | 1 404 033 | 3/2004 |
| JP | 02-032281 | 2/1990 |
| JP | 06-281716 | 10/1994 |
| JP | 09-064800 | 3/1997 |
| JP | 2004-233216 | 8/2004 |
| WO | WO 2008/067397 | 6/2008 |
| WO | WO 2008/106624 | 9/2008 |

OTHER PUBLICATIONS

European Search Report dated Oct. 4, 2010 in corresponding European Patent Application No. 10164470.6.

* cited by examiner

*Primary Examiner* — Christian Hannon
(74) *Attorney, Agent, or Firm* — Harness, Dickey & Pierce, P.L.C.

(57) ABSTRACT

A receiver comprising a plurality of antennas immobilized in relation to each other and positioned on a movable carrier, each antenna being adapted to receive a signal and output a corresponding, received signal; first means for generating, from the received signals, a sum signal; second means for generating, from the received signals, one or more difference signals; third means for deriving, from the sum signal, timing information; fourth means for receiving the sum signal, the difference signal(s) and the timing information and outputting information relating to an angle between a direction of the antennas and a direction of reception of the signal.

10 Claims, 2 Drawing Sheets

RECEIVER AND A METHOD OF RECEIVING A SIGNAL

This application claims priority under 35 U.S.C. §119(e) to U.S. Provisional Application No. 61/213,430, filed on Jun. 8, 2009, the entire content of which is hereby incorporated by reference.

The present invention relates to a receiver and a method of receiving a signal using multiple antennas where information is derived from a sum signal and used for deriving information from a difference signal in order to estimate an angle between the antennas' bore sight and a signal source.

On a moving vehicle, e.g., a ship, aircraft, car or train, the data communication between a satellite and an onboard satellite modem depends on the ability to point the antenna towards the satellite at all times. Especially in situations where the received signal has a low signal to noise ratio (at the edge of satellite coverage) the pointing accuracy is of great importance.

In a first aspect, the invention relates to a receiver comprising:
- a plurality of antennas immobilized in relation to each other and positioned on a movable carrier, each antenna being adapted to receive a signal and output a corresponding, received signal,
- first means for generating, from the received signals, a sum signal, second means for generating, from the received signals, one or more difference signals,
- third means for deriving, from the sum signal, timing information,
- fourth means for receiving the sum signal, the difference signal(s) and the timing information and outputting information relating to an angle between a direction of the antennas and a direction of reception of the signal.

In the present context, an antenna is an element adapted to receive electromagnetic radiation and output a corresponding signal. The corresponding signal corresponds in amplitude, phase and/or frequency to the received signal. Preferably, the electromagnetic radiation is radio waves, ultrasound radiation, or the like, such as with a frequency between 0.1 and 100 GHz, such as 0.5-50 GHz, such as 1-5 GHz, such as 1 and 2 GHz. A preferred type of antenna is adapted to receive signals output from satellites and thus are highly direction sensitive, typically using an array antenna, a microstrip antenna and/or a parabolic disc for receiving and collecting the signal.

In this context, it is noted that a single antenna may be formed by any number of antennas/sensors which may be positioned at different physical positions. Thus, if a 2×2 antenna/sensor array is used, the outputs of the two antennas/sensors of each column may be combined (to effectively be one antenna per column) when determining an angle along the direction of the rows, and the two antennas/sensors of the individual rows may be combined (to effectively be one antenna per row) in order to determine an angle along the columns. Then, the output of each individual antenna/sensor may be used in more than one of the overall antennas.

The antennas are immobilized so as to be movable/rotatable together by moving/rotating the carrier. Naturally, the antennas may be detachable or removable from the carrier, and the immobilization may be obtained using any suitable means such as screws, welding, soldering, clamping or the like. Preferably, the antennas are direction sensitive and directed in at least substantially the same direction when immobilized.

The generation of the sum signal may be the combining of either signals of the same type (electromagnetic radiation, for example) when received, or the combination of corresponding signals, such as electric signals. The combination of electromagnetic radiation may be the combination of parts (such as half) of the radiation received, in order to also have a part of the radiation for generation of the difference signal(s), and the sum signal may be a simple superposition or co-transmission of the two or more received (parts) signals.

Having converted the received signals to electric signals opens a wide range of technologies for generating the sum signal, such as the simple superposition or adding of the signals to the feeding of the individual signals into a DSP and performing the summing mathematically.

A single sum signal may be sufficient, but multiple sum signals may be used if found desirable, where each sum signal is based on signals from different groups of antennas.

The generation of the difference signal(s) usually will be performed on the basis of pairs of antennas (which again may each be formed by one or more single antenna(s)/sensor(s)), so that a difference signal relates to the difference between the signals obtained from two antennas. In this manner, the difference signal will contain information relating to an angle between a line through the antennas (or the centres of each of two groups of antennas/sensors, each group forming a single antenna) and a direction toward the signal source/origin.

Again, a difference signal may be derived in a number of manners either on the basis of the signals received or signals corresponding thereto.

As a difference signal normally is much weaker than the sum signal, the invention relates to the deriving of timing information from the sum signal and using this information for deriving information from the difference signal(s). In one example, it may be desired to determine a signal strength of a difference signal, whereby it is desired to determine a frequency and/or phase thereof in order to determine the signal at the correct points in time, where the signal or signal bits occur. When this signal is very weak, it may be difficult to determine its phase/frequency, but as these parameters are related in the sum signal and difference signal(s), they may be derived from the sum signal and used as the timing information.

Two or more difference signals may be handled independently of each other.

In general, the timing information may describe or define relative or absolute points in time relating to the sum signal, which points in time may be used for deriving information from the difference signal(s) and/or alter the difference signal (s), c.f. below. A frequency may be determined or defined as a number of (equidistant) relative points in time, and a phase as one or more absolute points in time.

Naturally, the direction of reception or transmission of the signal is the direction from which the signal is received, such as the direction to/from a signal source, such as a satellite/transmitter.

As mentioned above, the generation of the sum and difference signals may, as may the generation of the timing information and angle information, be determined or generated in separate elements, such as processors, signal processors, wave guides, microstrip, or the like, or may be determined in one or more general processors, computers, and/or FPGAs, such as a single DSP. This is merely a design choice.

Any number of antennas may be used, as mentioned above. Preferably, more than two antennas are used, and these are not positioned on a straight line. When two pairs of antennas (where an antenna may form part of more than one pair) define non-parallel planes together with the signal source, the antennas and the carrier may be moved so as to point directly toward the signal source.

In one embodiment, the third means are adapted to derive, as at least part of the timing information, a carrier frequency of the signal. This frequency will determine the frequency also of the difference signal(s) and thus be useful for deriving information from the difference signal(s).

In that or another embodiment, the third means are adapted to derive, as at least part of the timing information, phase information.

In a third embodiment, the third means are adapted to derive, as at least part of the timing information, predetermined symbols of the signal. Usually, the signal received will comprise both a carrier frequency but also other information encoded within the carrier frequency or modulated with that frequency. Such information may be used for e.g. checking or verifying that the signal is from the correct source or with the correct contents (correct/expected coding or the like).

In a preferred embodiment, the fourth means is adapted to adjust the difference signal(s) in accordance to the timing information. In this manner, the difference signal(s) may be provided with desired properties before any information is derived therefrom.

Preferably, the fourth means is also adapted to adjust the sum signal in accordance with the timing information. This is particularly relevant when information is also derived from the sum signal and used in determination of the angle information. This adjustment may be a filtering of the signal(s) to reduce noise. In one situation, the signals are first converted to a given frequency, for example, whereafter a band filtering is used to remove noise outside the desired frequency band.

In one situation, the fourth means is adapted to output information relating to a signal level/amplitude of the sum signal and a signal level/amplitude of the difference signal(s) altered in accordance to the timing information.

In a preferred embodiment, the receiver has means for determining whether the signal received is output from a predetermined signal source and, if so, having the fourth means output the angle information and, if not, not output the angle information or output other information, such as causing the antennas to receive a signal from another source. This is described in more detail further below.

Preferably, the angle information is used for directing the antennas toward a signal source. In that situation, the receiver may further comprise means for moving the movable carrier, the moving means being responsive to the information relating to the angle.

Also, naturally, the actual signal received may be detected and used for any desired purpose, which may be possible when the receiver further comprises means for outputting information relating to the sum signal.

An interesting embodiment of the invention relates to a transceiver comprising the above-mentioned receiver and a transmitter, the transmitter being adapted to feed a signal to be transmitted into the means for generating the sum signal. Thus, the sum signal generating means may be adapted to reversely divide the signal to be transmitted into a number of at least substantially identical signals and feed these signals to the antennas for transmission.

Another interesting embodiment is a receiver which, as the above-mentioned receiver, is adapted to receive a signal from a signal provider, the receiver comprising:
    means for tracking the angle toward or a position in relation to a source of the received signal and
    means for determining whether the signal has been output by a predetermined signal source and, if not, controlling the receiving means to receive another signal.

The determination of whether the signal stems from the predetermined signal source may be performed in a number of manners from the signal, such as from contents in the signal. The source may provide, as part of the signal, identity information identifying the source, or the signal may contain a coding, symbols, a carrier or the like, from which the source may be identified.

The tracking may be intermittent or continuous and may be used for e.g. maintaining a direction of one or more antennas of the receiving means toward the signal source. If another signal is to be received, the direction of the antenna(s) may be altered in order to receive another signal, typically from another signal source.

Also, the tracking may be used for determining a position of the receiving means. Thus, tracking on the wrong signal source could derive a wrong position of the receiving means.

A second aspect of the invention relates to a method of receiving a signal, the method comprising:
    each of a plurality of antennas immobilized in relation to each other and positioned on a movable carrier receiving the signal and outputting a corresponding, received signal,
    generating, from the received signals, a sum signal,
    generating, from the received signals, one or more difference signals,
    deriving, from the sum signal, timing information,
    outputting, on the basis of the sum signal, the difference signal(s) and the timing information, information relating to an angle between a direction of the antennas and a direction of reception of the signal.

As mentioned above, a number of manners exist of generating the sum and difference signals, and different types of means may be used from wave guides over a plurality of processors to a single digital signal processor (DSP).

Any number of antennas may be used, and each antenna may be formed by any number of antennas/sensors. Preferably more than two antennas are used, and these are positioned not on a straight line. In fact, it is preferred that one pair of antennas defines a plane (through the antennas and the signal source) perpendicular to that of another pair of antennas. Then, a difference signal is derived from each such pair of antennas.

In one embodiment, the deriving step comprises deriving, as at least part of the timing, information, a carrier frequency of the signal.

In another embodiment, the deriving step comprises deriving, as at least part of the timing information, phase information.

In a third embodiment, the deriving step comprises deriving, as at least part of the timing information, predetermined symbols of the signal.

Preferably, the outputting step comprises adjusting the difference signal in accordance to the timing information, and even more preferably, the outputting step comprises also adjusting the sum signal in accordance with the timing information.

In a preferred embodiment, the outputting step comprises outputting information relating to a signal level/amplitude of the sum signal and a signal level/amplitude of the difference signal altered in accordance to the timing information.

Naturally, the method may further comprise the step of moving the movable carrier, the moving means being responsive to the information relating to the angle.

Also, the method may further comprise the step of outputting information relating to the sum signal.

In a preferred embodiment, the method comprises determining, such as from the sum signal, whether the signal received is output from a predetermined signal source and, if so, allowing the outputting of the angle information and, if not, preventing the outputting of the angle information and/or facilitating outputting of other information, such as information causing the reception a signal from another source. This is described in more detail further below.

Finally, the method may further comprise the step of feeding a signal to be transmitted into the means for generating the sum signal so as to transmit the signal from the antennas.

An interesting embodiment of the invention relates to a method of receiving a signal from a signal provider, the method comprising:

tracking the angle toward or a position in relation to a source of the received signal, determining whether the signal has been output by a pre-determined signal source and, if not, controlling the receiving means to receive another signal.

In the following, preferred embodiments of the invention will be described with reference to the drawing, wherein.

Figure 1:
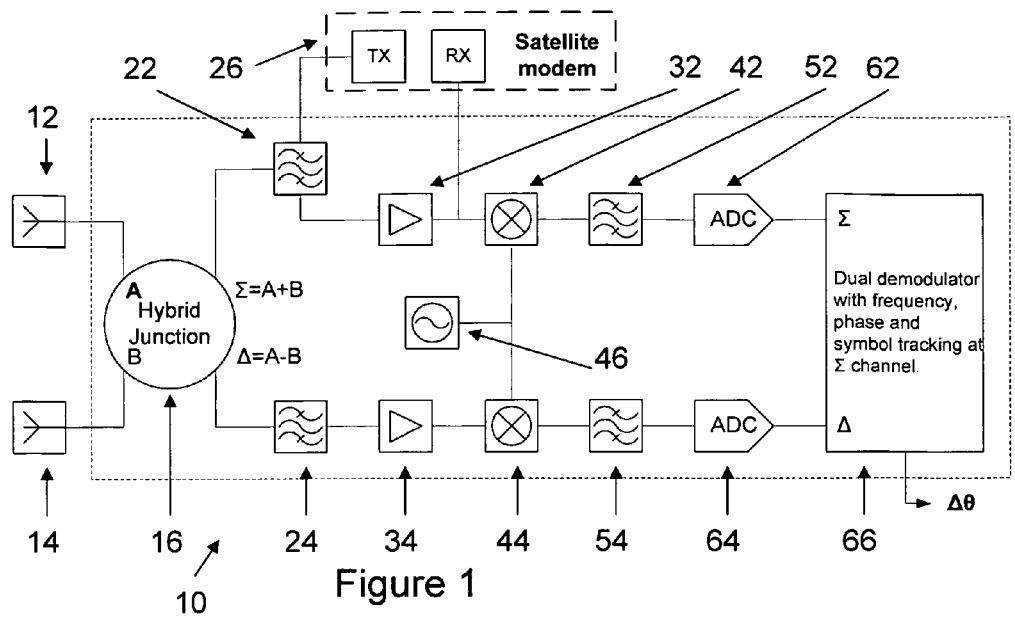
FIG. 1 illustrates a tracking receiver with a dual demodulator based on a sum and difference RF channel.

FIG. 1 illustrates the main components of a receiver 10 in which two antennas 12 and 14 are fixed on a common fixture (see FIG. 3) which is movable.

Outputs from the antennas 12 and 14 are transmitted to a hybrid element 16 adapted to generate, from the outputs, a sum signal and a difference signal which signals are fed to respective filters 22 and 24 and amplifiers 32 and 34. The filter 22 is a broad-band duplex filter adapted to transmit the whole (34 MHz wide) Inmarsat frequency range. The filter 24 corresponds to filter 22 but does not have to be a duplex filter.

A demodulator 26 uses the sum signal to perform an estimation and tracking of the carrier frequency and carrier phase. From these estimated values the sum channel can be demodulated and the known symbols as pilot symbol, UW etc. in the data transfer can be verified.

Actually, the RF front end design in FIG. 1 is similar to the well known radar monopulse tracking principle. In a satellite receiver, however, the received signal from the satellite is not known in advance. The received signal is the data channel from the satellite which is modulated and carries unknown data. There are no restrictions on the types of modulations which may be, e.g., QPSK QAM, CW, TDMA, DCMA etc. Naturally, the signal or data may be continuous, as that from a satellite, or bursted, as that transmitted to satellites.

Subsequently, a downshifting in frequency to a lower frequency is performed using a signal generator 46 and two multipliers 42 and 44, whereafter a second filtration, now selecting a narrow frequency band (such as 100 kHz wide) is performed in filters 52/54.

Both the sum and difference signals are ADC converted in converters 62 and 64 and fed into a digital processor or a DSP, such as a digital dual coherent demodulator, 66 which is adapted to determine the amplitude and phase of the strong sum signal and use this information for deriving a phase and amplitude of the difference signal.

The estimated parameters such as carrier frequency, carrier phase and symbols from the sum channel are used to demodulate the difference channel and the amplitude and phase of the difference channel with the sum as reference is found. From the amplitude and phase difference between the sum and difference channel an optimal measure of the pointing error for the given signal to noise ratio of the received signal can be derived.

Figure 4:
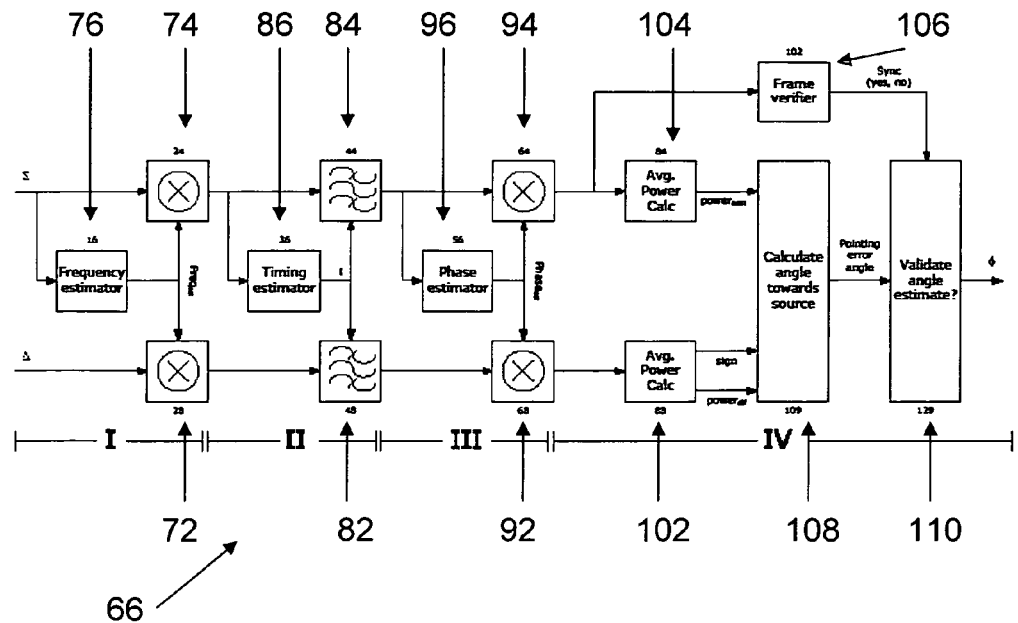
FIG. 4 illustrates a preferred embodiment of processes for determining the angle error.

More particularly, the operation of the DSP 66 is illustrated in FIG. 4 illustrating the main processes performed.

In the first stage (I) of this processor DSP, the frequency is derived from the sum signal, and the determined frequency is mixed separately with the sum and difference signals to down convert these signals to base band. More particularly, mixer elements 72 and 74 receive a frequency from an estimator 76 and add this to the incoming signals in order to perform the down conversion. Thus, the two signals have now been converted to the same frequency.

At a second stage (II), a timing estimator 86 is used for estimating the timing of the individual symbols of the signals and controls filters 82/84 in order to obtain the correct timing of the incoming signals.

A third stage (III) includes a phase estimator 96 that estimates the remaining phase offset of the sum signal and forwards this information to mixer elements 94 and 92 acting to remove the offset and bring the two signals to the same phase.

At stage four (IV), the signals are rotated depending on their position in the constellation and the specific modulation type. A QPSK modulated signal is divided into four regions (equal to a rotation of 45°, 135°, −45° or −135°), whereas a 16-QAM modulated signal has twelve regions. Furthermore amplitude modulated signals (such as a QAM modulated signal) should likewise be level compensated. Power calculators 102/104 perform this rotation and level compensation before the mean of the real value of the individual points is determined to determine an average symbol level. Also, the sign of the points or position of the difference signal on the real axis of the coordinate system will determine the sign or direction of the error angle determined hereafter. This is determined in the power calculator 102.

In addition, a frame verifier 106 receives the sum signal with the symbol determined in order to verify whether the signal detected is that expected.

Figure 3:
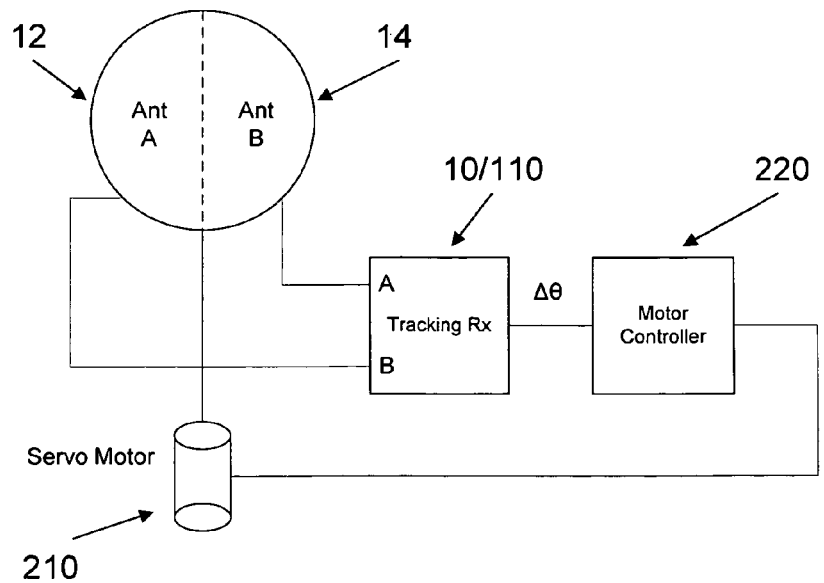
FIG. 3 illustrates a servo loop using the proposed tracking receiver.

Dividing the average symbol level of the difference signal with that of the sum signal (and multiplying a suitable constant) now directly determines the error angle between the direction of transmission of the signal sensed by the antennas and a direction of the antennas, and when the sign or direction of the angle is also known (it is in a plane defined by centres of the two antennas), the output of the method may be used for operating a driving unit to re-direct the antennas so as to point directly towards the source of the signal, as illustrated in FIG. 3. This calculation is performed in the element 108.

Finally, element 110 validates the error angle received from 108 using information from the frame verifier 106. Thus, if the signal received is not the correct one, the angle correction is not correct, and the antennas need not be rotated correspondingly. In that situation, the antennas may be rotated to identify a signal from another source, and if this is the correct source, the antennas may subsequently track this in order to maintain communication with that source.

Additionally, returning now to FIG. 1, the receiver may be a transceiver when the modem 26 also has a transmitting part. The data to be transmitted is fed "backwards" into the duplex filter 22 or filter combined with a rx/tx switch 22 and thus through the hybrid 16 and divided equally to the antennas 12 and 14 and output in the bore sight of the antenna. In some systems, the receiving and transmitting signals are separated in time, and in others, the signals have different frequencies.

Naturally, the receiver need not receive the sum signal after the amplifier 32 but may derive it directly from or at the frame verifier 106. The demodulation of the Rx signal normally will be the same, and the duplication of signal processing equipment is no advantage.

Thus, the same processing equipment normally used for deriving the Rx signal may be used also for the present invention with the adaptation that the corresponding adaptations performed to the sum signal may be performed also of the difference signal and that an angle may be derived therefrom.

The results of this new tracking receiver design are:
1. As long as the satellite signal can be used of the modem the tracking receiver can measure the pointing error and the antenna can be pointed towards the satellite using a servo loop as shown in FIG. 3. Compared to systems using non coherent amplitude measurements this method gives the same accuracy on AO at about 5 dB lower signal to noise ratio.
2. The tracking receiver will only track the desired signal. It will not track other satellite signals with different frame structures etc. It will also not track microwave noise sources which is a problem with prior systems using power detectors to measure the pointing error.

Figure 2:
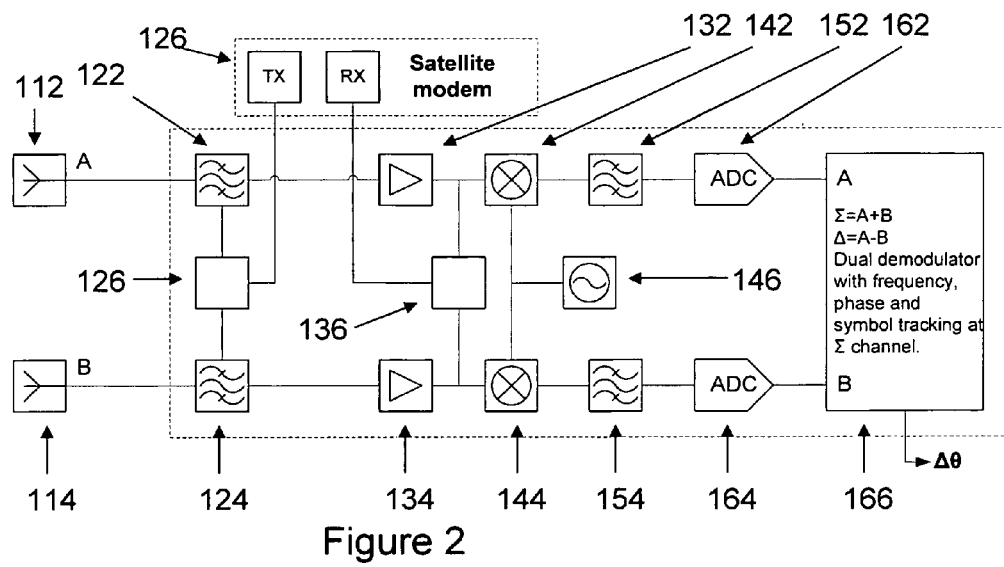
FIG. 2 illustrates a tracking receiver with a dual demodulator based on A and B RF channels.

Instead of using a sum and difference channel the tracking receiver can also be implemented with A (left) and B (right) channel as shown in FIG. 2. The sum and difference channels are then calculated in the digital domain before the dual demodulator. This method requires two duplex filters 122, 124 where the sum and difference method of FIG. 1 only requires a single duplex filter.

More particularly, the receiver 110 of FIG. 3 again has two antennas 112 and 114 again fixed to each other on a movable carrier. The outputs of the antennas 112 and 114 are filtered in respective filters 122 and 124

In the method illustrated in FIG. 2 the pointing direction of the Tx antenna beam depends of the phase difference in the Tx part of the two duplex filters and the directions of the Rx antenna beam depends of the phase difference in the Rx part of the two duplex filters. To make a system where the Tx and Rx antenna beams point in the same direction it is therefore desired to measure and pair the duplex filters to match closely in transfer characteristics on both the Rx and the Tx port over frequency and temperature. The method in FIG. 1 is therefore, in this respect, better and cheaper to implement than the solution shown in FIG. 2.

Using sum and difference RF channels instead of A and B RF channel makes the tracking receiver less sensitive to amplitude and phase difference between the two RF channels.

In FIG. 2, the signals received from the antennas 112/114 are filtered in duplex filters 122/124, amplified in amplifiers 132/134, downshifted using multipliers 142/144 and signal generator 146, subsequently filtered in filters 152/154 and finally converted in converters 162/164 into digital signals. Thus, the signal handling is very close to that in FIG. 1 of the sum and difference signals.

In FIG. 2, the received signal is derived after the amplifiers 132/134 by summing, in an adder 136, the signals. Also transmission is achieved using a power divider 126 and forwarding the divided signals into the filters 122/124.

The operation of the DSP 166 closely matches that of the DSP 66 described further above in relation to FIG. 4 with the difference that the DSP 166 starts by generating the sum and difference signals from the two signals received. There after the signal processing may be the same.

In the above embodiments, only two antennas 12/14/112/114 are illustrated. This gives one sum signal and a single difference signal. On the basis of this information, the angle error in a plane defined by the symmetry axes of the antennas may be determined. Any movement of the signal source (typically a satellite) out of that plane cannot be taken into account.

To obtain a receiver adapted to determine the angle error also out of this plane, so as to be able to track any movement of the antennas in relation to the source, three or more antennas may be used. In this situation, a single sum signal but a number of difference signals may be obtained. Each difference signal relates to the signals of two antennas (or groups of antennas/sensors) and thus to an error angle defined by the axes of those two antennas. Thus, if the planes of two pairs of antennas (as may be obtained using three antennas not positioned on a straight line) intercept, any angle toward a signal source may be determined.

In FIG. 3, the antennas 12/112 and 14/114 are fixed on a carrier (not illustrated) rotatable by a servo motor 210. The outputs of the antennas are received by a receiver 10/110 as that of FIG. 1 or 2, and an output is generated relating to the angle between a direction of transmission of the signal and a general direction of the antennas. This signal is fed to a motor controller 220 which operated the motor to have this angle reduced or preferably removed.

Thus, the pointing error measurement principle is adapted in a servo loop as shown in FIG. 3 to make a full tracking antenna.

The invention claimed is:

1. A receiver comprising:
 a plurality of antennas immobilized in relation to each other and positioned on a movable carrier, each antenna being configured to receive a signal and output a corresponding, received signal,
 a signal generator configured to generate, from the received signals, a sum signal and one or more difference signals,
 a processor configured to derive timing information from the sum signal, the timing information including at least one of a frequency and a phase of the sum signal, determine a signal strength of the one or more difference signals using the timing information of the sum signal, and output information relating to an angle between a direction of the antennas and a direction of reception of the signal based on the signal strength of the one or more difference signals.

2. A receiver according to claim 1, further comprising:
 a driving unit configured to move the movable carrier, the driving unit being responsive to the information relating to the angle.

3. A receiver according to claim 1, further comprising:
 a tracking unit configured to track the angle toward a source of the received signal or a position in relation to a source of the received signal,
 a signal verification unit configured to determine whether the signal has been output by a desired signal source and, if not, control the receiver to receive another signal.

4. A transceiver comprising the receiver of claim 1 and a transmitter, the transmitter being configured to feed a signal to be transmitted into the signal generator.

5. A receiver according to claim 1, wherein the processor is configured to determine an average symbol level of the one or more difference signals and an average symbol level of the sum signal, and divide the average symbol level of the one or more difference signals by the average symbol level of the sum signal to determine the information relating to an angle between a direction of the antennas and a direction of reception of the signal.

6. A method of receiving a signal for each of a plurality of antennas immobilized in relation to each other and positioned on a movable carrier receiving the signal and outputting a corresponding, received signal, the method comprising:
- generating, from the received signals, a sum signal,
- generating, from the received signals, one or more difference signals,
- deriving timing information from the sum signal, the timing information including at least one of a frequency and a phase of the sum signal,
- determining a signal strength of the one or more difference signals using the timing information of the sum signal, and
- outputting information relating to an angle between a direction of the antennas and a direction of reception of the signal based on the signal strength of the one or more difference signals.

7. A method according to claim 6, further comprising:
moving the movable carrier based on the information relating to the angle.

8. A method according to claim 6, further comprising:
outputting information relating to the sum signal.

9. A method according to claim 6, further comprising:
feeding a signal to be transmitted into a signal generator so as to transmit the signal from the antennas.

10. A method according to claim 6, the method comprising:
- tracking the angle toward a source of the received signal or a position in relation to a source of the received signal,
- determining whether the signal has been output by a desired signal source, and
- receiving another signal if the signal has not been output by a desired signal source.

* * * * *

UNITED STATES PATENT AND TRADEMARK OFFICE
CERTIFICATE OF CORRECTION

PATENT NO. : 8,447,254 B2
APPLICATION NO. : 12/801185
DATED : May 21, 2013
INVENTOR(S) : Ulrich Vesterager Gothelf et al.

Page 1 of 1

It is certified that error appears in the above-identified patent and that said Letters Patent is hereby corrected as shown below:

Title Page, item (73) should read,

(73) Assignee: Thrane & Thrane A/S, Lyngby (DK)

Signed and Sealed this
First Day of October, 2013

Teresa Stanek Rea
*Deputy Director of the United States Patent and Trademark Office*